Patented Sept. 22, 1931

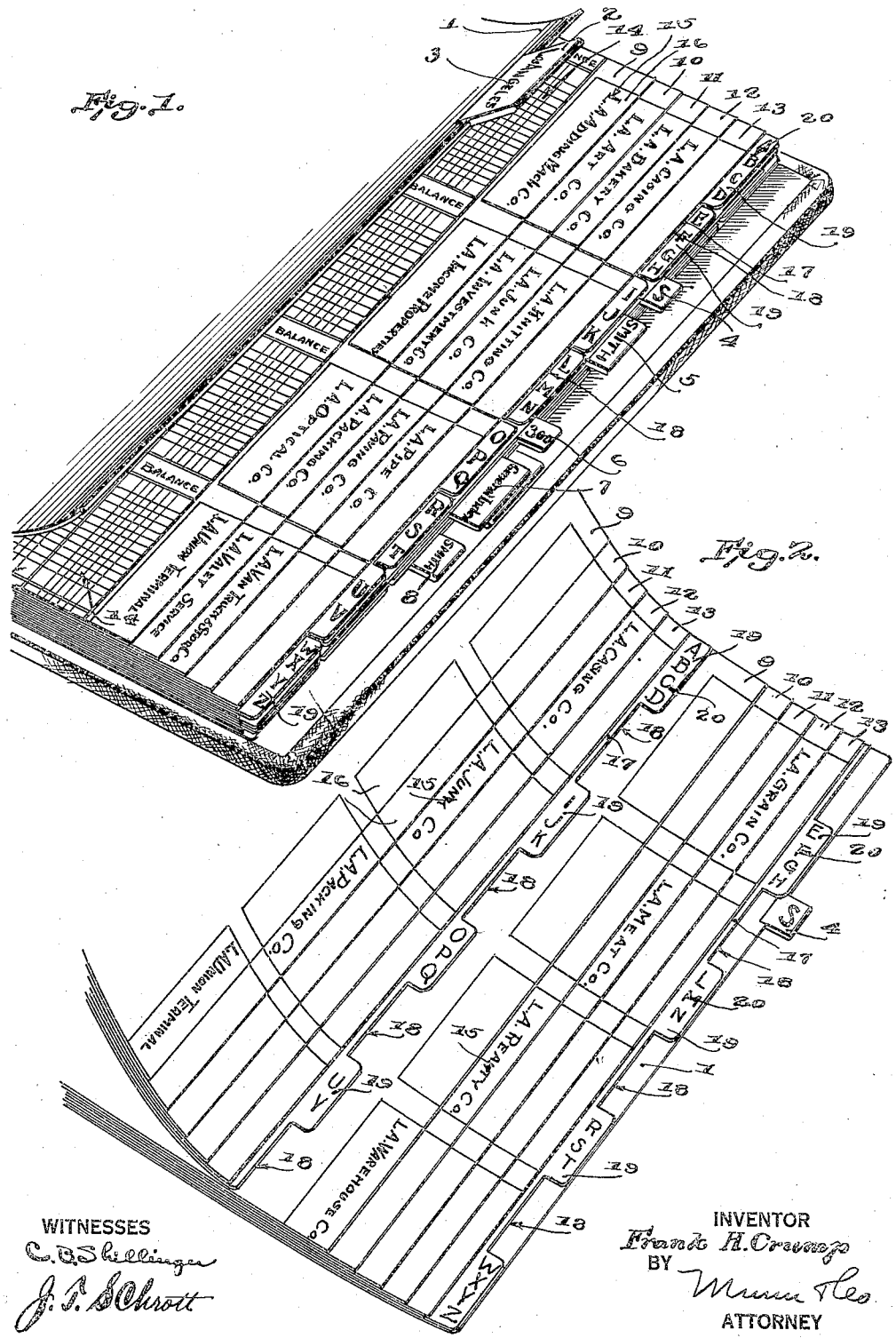

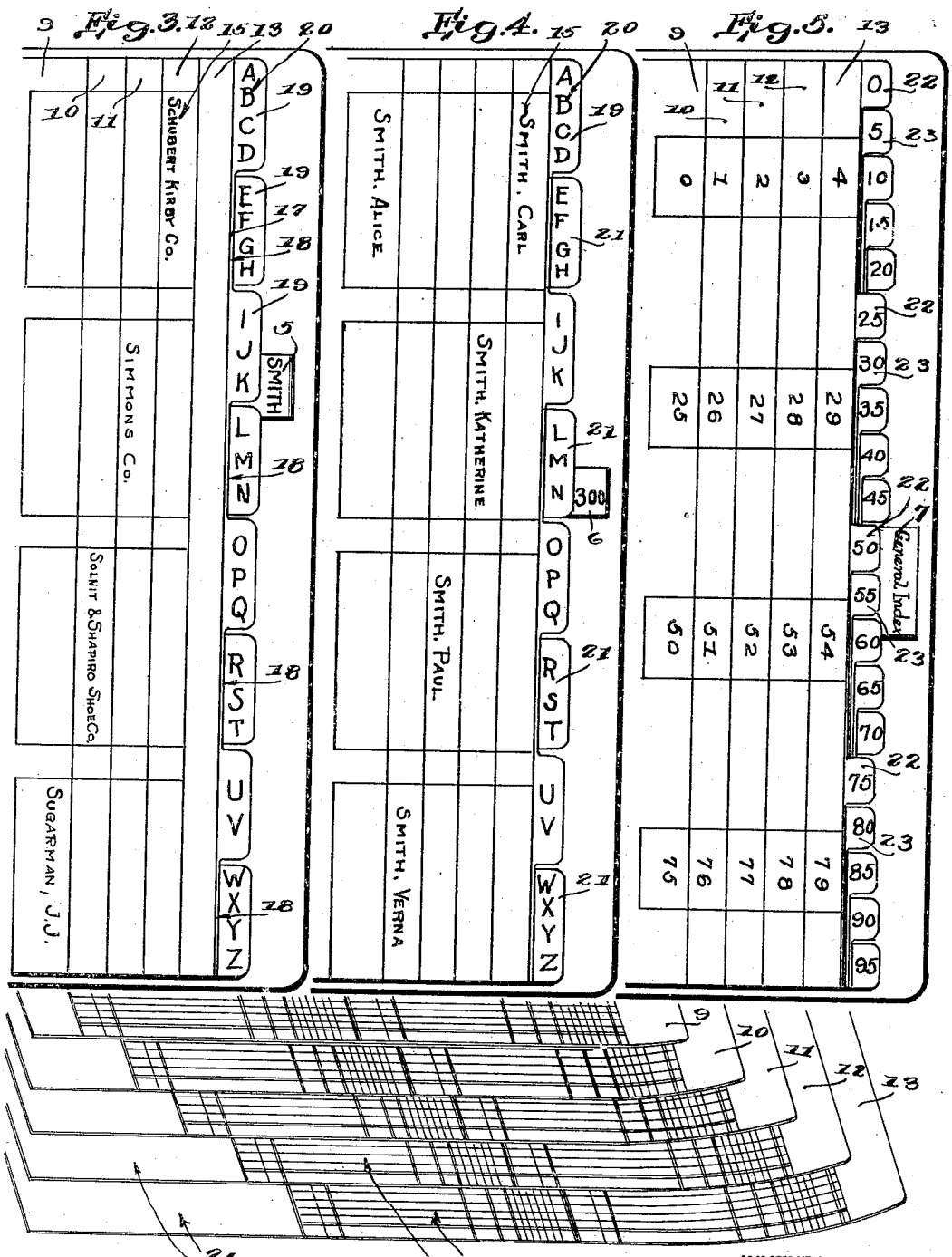

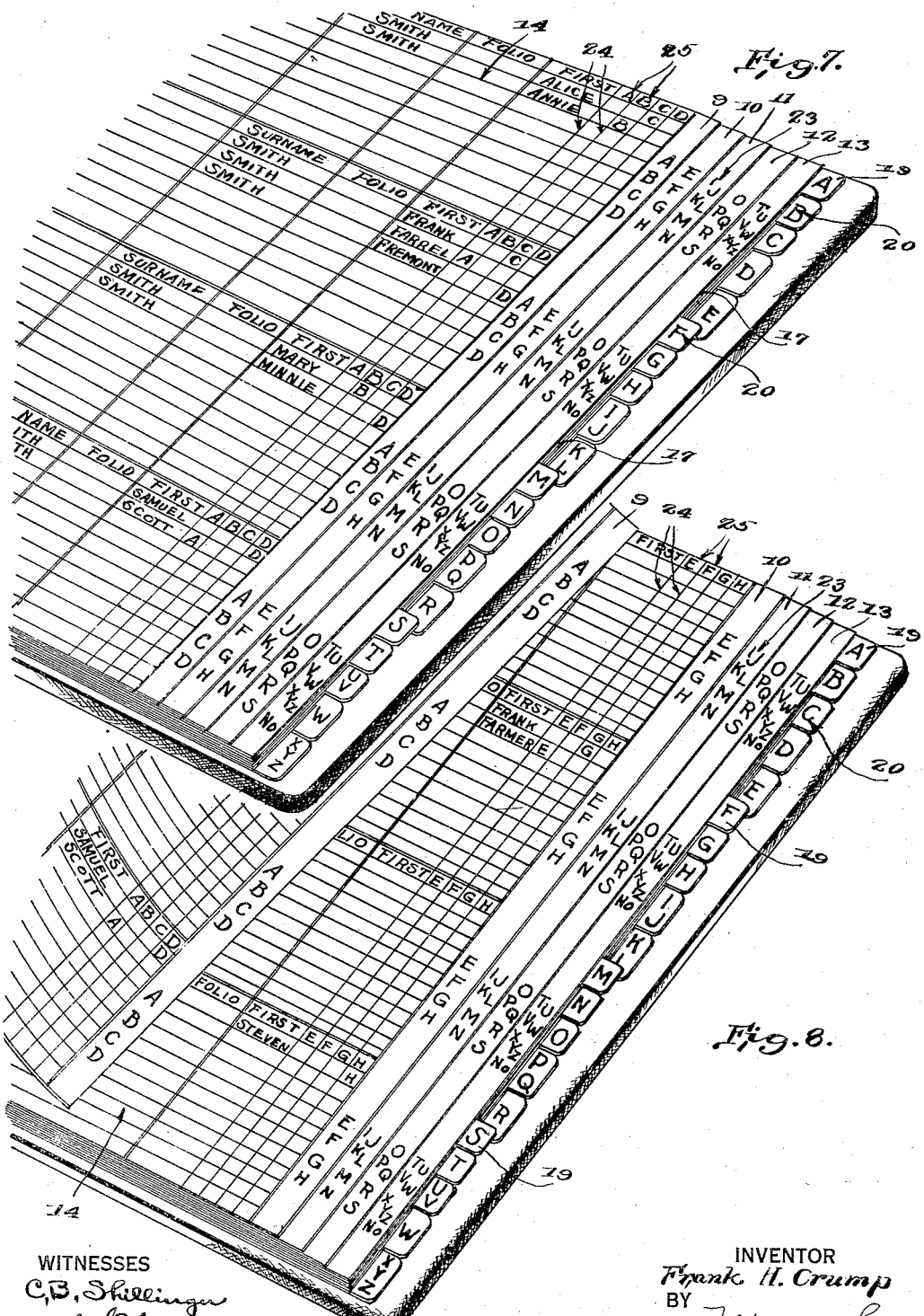

1,824,659

UNITED STATES PATENT OFFICE

FRANK H. CRUMP, OF LOS ANGELES, CALIFORNIA

LEDGER AND INDEX THEREFOR

Application filed December 11, 1928. Serial No. 325,332.

This invention relates to improvements in ledgers, account books and the like and it consists of the constructions, combinations and arrangements herein described and claimed.

An object of the invention is to provide a loose leaf or other ledger or book in which each page of a given set of account pages is ruled to accommodate a plurality of accounts each of which is instantly accessible both by virtue of a stepped arrangement of said pages and the provision of a multiple index page provided with marginal tabs having legends furnishing a clue to the various accounts.

A further object of the invention is to provide a ledger in which a determined number of pages are set apart to compose what is herein known as a set of record or account pages, these pages being made successively wider so as to expose certain margins, the setting apart being accomplished by what is known as a secondary or multiple index page which has marginal tabs with legends making some kind of a reference or furnishing some kind of a clue to the various associated accounts headed by the exposed margins.

Another object of the invention is to provide both a ledger and an index incorporated therein, both being so constructed and arranged that a large number of accounts can be accommodated and that any desired account can be instantly located.

Other objects and advantages appear in the following specification, reference being had to the accompanying drawings in which Figure 1 is a perspective view of a part of the ledger, the fly leaf being suspended in order to reveal the index, Figure 2 is a detail perspective view showing the pages held in such a manner as to illustrate the sets of record pages, Figure 3 is a detail plan view illustrating the principle of the invention when employed for recording and indexing under particular first and second initial letters, Figure 4 is a detail plan view illustrating the principle when recording and indexing a particular surname and the initial letters of given names, Figure 5 is a detail plan view illustrating the principle when used in connection with numerical accounts, Figure 6 is a detail perspective view of the set of pages of the primary index showing the progressively advanced account rulings, Figure 7 is a detail perspective view of a further development of the principle which is herein known as a tertiary index, Figure 8 is a similar view showing one of the pages of a set of pages in the tertiary index slid back to reveal certain data on the following page.

As has been indicated already in a brief manner, the purpose of the invention is to not only make possible the keeping of a large number of accounts, but particularly to enable the finding of a wanted account with the least possible effort. This is a facility which will render the ledger of great value to commercial establishments where there are frequent demands upon the notice of an instant to locate a particular account, no matter how many are covered by the ledger.

The principle of the invention is contributed to both by the structure of the book and by the arrangement of the index. One definitely cooperates with the other for the accomplishment of the foregoing purpose. While this is true, the secondary or multiple index might well be used as an independent index for a record other than that contained by the primary index. This is particularly true of what is herein known as the tertiary index which may be employed as an index for another book or set of books.

With these brief statements attention is directed to the drawings. Figure 1 illustrates the ledger as it appears with the front cover (not shown) swung back out of the way, and the fly leaf 1 slid back or lifted to reveal the principal features of the ledger and index. This fly leaf is known as the primary index page. It has a single leather or other tab 2 intended to bear a legend concerning a class of data. For example, the legend "Los Angeles", designated 3 will be common to all of the names of the concerns using this as a prefix.

Several primary index pages may appear in the ledger, others having the legend "S", designated 4, the next "Smith" designated 5, the next a selected number "300" designated 6, another "General Index" designated 7, and still another "Smith" designated 8. The legend 8 is identified with the tertiary index in Figures 7 and 8 which is described later on.

The following description runs from front o back of the ledger, and proceeds as though the various primary index pages 1 were being lifted or turned over to reveal the succeeding structure. Upon taking hold of the tab 2 in Figure 1 and lifting the primary index page 1, the pages 9, 10, 11, 12 and 13 of what is herein known as a set of record or account pages will be revealed. Each record page is provided with a plurality of account spaces 14 (Figs. 1 and 6). One is arranged below the other. Each will be appropriately ruled to serve a particular need. In the illustration, each page has four account spaces running from left to right of the book.

Each of the pages of the set is wider than the page immediately above. This exposes the right margins of the succeeding pages below the top page of the set and produces the stepped arrangement well shown in Figures 1 and 2. These exposed stepped margins carry the name with which the account on an adjoining account space 14 is concerned. The names 15, or such other identifying indicia as may be employed, may be written or printed directly on the exposed margins, or may be applied to slips of paper 16 which will be pasted on said margins. The important feature of the arrangement is that a large number of accounts will instantly be available upon lifting the primary index page 1.

The names of all of the accounts will stand out, and it is the work of but an instant to locate the desired account and turn to it. A set of record pages will comprise 2, 3, 4, 5 or more pages. The number of account spaces 14 arranged perpendicularly on each page multiplied by the number of pages arranged horizontally in each set will give the number of accounts visible above each secondary or multiple index sheet 17. The secondary index sheet will be used for the first letter of given names or all the second name of a firm or corporation.

For this purpose the multiple index sheet 17 of each set will be notched on the right margin as at 18 to produce tabs 19. The notches will alternate in the multiple index sheets of adjoining sets of record pages so that the tabs of the record sheet below will appear in the notches of the record sheet above. The appearance will be that of a continuous alphabet running from top to bottom of the book when lifting the primary index page 1 (see Figure 1). The letters of the alphabet are designated 20.

Each multiple index sheet will be notched according to the particular requirements. The number of notches and the number of tabs will depend on the number of accounts to be provided for. The more accounts that are desired to be recorded, the more divisions or notches and tabs are necessary. If there are four account spaces 14 on each record page, and one tab is wanted for each account space, only one secondary multiple index sheet 17 is required and it would have four notches and four tabs as illustrated in Figures 1 and 2.

It is deemed unnecessary, and in fact would probably not be possible, to state all of the various possible variations in the notching of the multiple index sheets. 2, 3, 4, 5 or more notches and tabs may be provided for each set of account spaces. This will permit considerable variation in the application of the characters 20. According to the illustration, each set of account spaces has two adjoining notches and tabs (see Figure 2) the uppermost tab of the top sheet 17 fitting over the uppermost notch of the bottom sheet 17; and the uppermost notch of the top sheet 17 revealing the uppermost tab of the bottom sheet.

Upon lifting the next single tab carrying the legend 4 another set of record sheets will be revealed. The exposed stepped margins of this set are shown in Figure 3. In lifting the tab mentioned the primary index page to which it is attached obviously will be lifted also. It will be remembered that the ledger contains a number of such index pages, there being one between the sets of record sheets of the various kinds. The set of record sheets now under consideration, (Fig. 3) provides for the recording of names (either firms or individuals) the first letters of which are identified by the legend 4 of the primary index page, and the second and immediately following letters are identified by the letters 20 on the tabs 19 of the secondary or multiple index pages 17 which back the sets of record pages in the manner precisely as before.

The next set of record pages is to be found under the primary index page carrying the third single tab on which is imprinted the legend 5. This legend reads "Smith". Figure 4 shows what appears in this set of record pages. All accounts under the name of "Smith" are covered by this set of pages. These names are so arranged on the stepped, exposed margins of the record pages that the initial letters of the first given names will come opposite to the corresponding letters 20 on the tabs 19 of the associated secondary index pages. For instance "Carl Smith" would be found somewhere opposite the uppermost tab 19. "Howard Smith" would appear in the second set of record pages and opposite to the second tab 19.

In order to have access to the account of "Howard Smith" (not shown) the bookkeeper would lift the uppermost set of record pages appearing in Figure 4 by taking hold of the exposed tab 19, lifting the corresponding primary index page and thus exposing the second set of record pages with which the tabs designated 21 in Figure 4 are concerned.

Lifting of the next single tab bearing the numerical legend 6 which reads "300", will reveal record pages in which the accounts are identified by numbers. The arrangement appears as in Figure 5. The tabs 22 protrude from the margin of a primary index page which is identical in principle with any of the pages previously denoted 17. The notches by which these tabs are provided are much larger than heretofore, and the tabs are considerably smaller. But they are large enough to carry the numerical legends.

Each tab will be concerned with five accounts, according to the present arrangement. The various accounts will be identified by appropriate numerals appearing on the exposed stepped margins of the record pages 9 to 13. The legend "0" will be concerned with five accounts numbered from "0" to "4". The legend 25 will be concerned with five accounts running from "25" to "29", etc. The legends on succeeding tabs will similarly relate to adjoining accounts in precisely the same manner. Access to the set of accounts next succeeding will be had by lifting any one of the four tabs "22" (Figure 5). The set of tabs 23 will then be uppermost. These protrude from a similar primary record page. Any account within the numbers "5" to "9" will be found opposite to the legend "5" on the uppermost tab 23. The same principle obtains in respect to the other accounts and numbered tabs.

A page containing a single tab with the legend "7" and reading "General index" may be used to divide the ledger between accounts of one kind and accounts of another. Upon lifting this particular tab there will be revealed a primary index page carrying another single tab containing the legend "8". Again this legend is the name "Smith". It might be any other popular or much used name. Upon lifting this tab there will be revealed what is known as the tertiary index. The details of this are shown in Figures 7 and 8.

The tertiary index is intended for recording the first given name and the initial or initials of succeeding given names of persons. On the same principle it is possible to index the names of firms or other concerns. A complete alphabet, generally designated 23 in Figures 7 and 8, is printed on the exposed margins of the record sheets 9, 10, 11, 12 and 13 opposite to the various account spaces 14. The alphabet appears in block formation. The letters are printed in vertical rows, for instance page 9 has rows of A, B, C, D, page 10 has rows of E, F, G, H, etc.

These alphabets are intended to enable the finding of a name having a particular middle initial. To facilitate the recording of such names the various pages are ruled to provide vertical columns 24 which are headed by letters 25 in each account space 14 to correspond with the particular letters on the adjacent margin of the same record page. The marginal letters appear in vertical rows, as already stated, while the corresponding letters 25 appear in horizontal rows.

Secondary index pages similar to the pages 17 in Figure 2 are used. The exposed margins of these pages are notched to produce tabs 19 as in instances before. There will be four long notches to provide four rather small tabs. The letters on the tabs of the first secondary index page 16 are A, F, M, and S. Thus all of the tabs of the succeeding page are B, G, N and T, etc. A secondary index follows each set of record pages.

The letters on the exposed tabs 19 are the initial letters of the first given names of persons recorded in the account spaces 14. For instance A on the uppermost tab 19 would indicate "Annie". If any has a middle initial "B" the second column 24 under the letter B would be traced until the wanted middle initial is found. A similar mode of search would enable the location of "Minnie D. Smith". All of the surnames in this particular tertiary index are "Smith" as indicated by the legend 8 on the last exposed single tab. Names of any kind may be catalogued according to the same methods.

Attention is directed to Figure 6. This illustrates the mode of applying the rulings to the various account spaces 14 to the successive record pages. The latter are progressively wider in order to expose the margins in stepped arrangement, and in order that the rulings may bear the same relationship to the exposed margins of the record pages they are progressively advanced as shown in Figure 6. Thus the blank spaces 26 at the left of the various pages of a set become progressively wider. These spaces may be used for recording any desired data. For instance, they may be used as working spaces in which arithmetical computations may be made prior to entries on the account spaces 14. But the important thing to observe is that the account rulings are stepped in consonance with the exposed margins so that the account spaces of succeeding pages bear the same relationship to the right margins of those pages.

It is regarded as within the province of the invention to supplement each record sheet with as many auxiliary pages as may be desired. For instance immediately below the page 9 (Fig. 1) there may be another and narrower page bearing corresponding rulings. The idea of this is to enable the extension of the accounts that are so long that they cannot be accommodated by the two sides of a single record page. These auxiliary pages are not shown, it being believed that the foregoing description affords a sufficiently clear illustration.

The operation of the ledger is reviewed as follows:—A principle in the structure of the ledger is to assemble the record pages 9 to 13 in sets between index pages which may either comprise the primary index page 1 (Fig. 1) and the secondary or multiple index page 17 (Fig. 2), or succeeding pages of the secondary index pages. For instance, the particular set of record pages in Figure 4 would be found between that pair of secondary index pages which carries the single tabs having legends marked 5 and 6. The pages of the foregoing record set are successively wider so that the exposed right margins present a stepped arrangement.

It is to these margins that the indicia 15 (Fig. 1) is applied. This is the name with which the account in the adjoining account space 14 is concerned. It may be the name of a person, firm, etc. The name may be written or otherwise applied to the exposed margin.

For the purpose of distinction, the primary and secondary index pages may be of various colors. It is deemed unnecessary to state what colors, for the selection is a matter of judgment both of the maker and user of the ledger. The permissible variation in the number of account spaces 14 running horizontally of the record pages and the number of notches 18 and tabs 19 has been described in some detail already.

The notching is done to meet particular needs. If there are four account spaces 14 on each record page, the associated multiple index page 15 should be notched to provide one tab 19 opposite each of the four accounts. The letters 20 should be applied as shown in Figures 1 and 2. If two tabs are wanted for each of the four accounts, the multiple index page would be notched to provide 8 tabs, and so on.

A ledger arranged according to the invention will permit the proper allocation of an account as regards the particular name of the creditor, and enables the instant finding of that account when wanted. For example, all firm names having a common beginning such as "Los Angeles" would be grouped as in Figure 1. It is desired to locate the "Los Angeles Bakery Co.". Upon lifting the primary index page 1 by means of the single tab 2 the names of all of the accounts in the first set are exposed. The name "Los Angeles" is accounted for by the legend 3 on the tab 2. The searcher locates the tab 19 bearing the letter B which is the initial letter of the bakery. Looking through the set of accounts adjacent to the letter B on the uppermost tab 19 he will locate the wanted account on record page 11. The pages on top are thrown over and the wanted account is exposed.

Suppose the account of "Los Angeles Realty Co." should be wanted. The initial letter R should be sought. The searcher would put his thumb on the tab 19 bearing that letter (Fig. 1) and by sliding it under the tab next highest and at the same time performing a lifting act would raise the uppermost multiple index page 17 (Fig. 2) and expose the second set of record pages. Located oppositely to the tab bearing the letter R will be found the wanted name.

An account under the name "Smith", indicated by the legend 5, would be found in the same manner. These "Smith" accounts are shown in Figure 4. All of these "Smiths" have only one given name. Other "Smith" accounts are shown in Figures 7 and 8. These other "Smiths" have two given names and would be catalogued in the tertiary index shown in Figures 7 and 8, just mentioned. Here the first name is written out but the second name is initialed.

In the tertiary index the exposed alphabetical letters 20 relate to the first given names while the vertical rows of alphabetical letters 23 and 25 are provided for the finding and recording of middle initials. A searcher for the name "Minnie D. Smith" would look opposite to the tab 19 bearing the "M" and in the last column 24 at the right for the initial letter "D". If "Minnie Smith's" middle initial had been "R" the name would have been recorded on record page 12 which includes the letter "R" in one of the vertical rows 23.

In addition to the particular use of which the tertiary index is herein designed to be put to, it is possible to employ it as an index for data located elsewhere than in the ledger. For example, it is not essential to use the tertiary index in connection with the particular account space 14. The tertiary index may refer to something other than accounts. The data to which it might refer could be general and subclasses of patents, etc.

Another mode of indexing the accounts would be by numbers. This is shown in Figure 5. The numerical accounts would be classified in a manner similar to that in which accounts are classified in Figures 1, 2, 3 and 4.

While the construction and arrangement of the improved ledger and index therefor is that of a generally modified form, obviously modifications and changes may be made without departing from the spirit of the invention or the scope of the claims.

I claim:—

1. A ledger comprising a plurality of pages having a succession of transverse columns, and division sheets separating the pages into sections, said sheets having tabs spaced to aline with the columns of the respective section, the tabs on one division sheet being staggered with respect to those on the adjacent sheet to make all of the tabs visible in a single row.

2. A ledger comprising a section of pages having a succession of transverse columns, and an index sheet underlying the section having tabs spaced to aline with the respective columns.

3. A ledger comprising a section of stepped pages having a succession of transverse columns, and an index sheet underlying the section said sheet having exposed and separated tabs respectively in alinement with said columns.

4. A ledger comprising a plurality of pages forming a section, the pages having a succession of transverse columns, and a sheet wider than the pages of the section, underlying said section and being notched to provide separated tabs respectively in alinement with said columns.

5. A ledger comprising a plurality of stepped pages forming a section, the pages having a succession of transverse columns, and a sheet exceeding the widest of said pages in width, underlying said section and being notched to provide separated tabs respectively in alinement with said columns.

6. A ledger comprising a plurality of progressively stepped pages having a succession of transverse columns, primary division sheets having tabs and dividing the pages into groups, and secondary division sheets separating a stepped progression of pages into sections, said secondary division sheets having separated tabs coacting with the primary sheet tabs, being in alinement with the columns of the respective section, the tabs on one division sheet being staggered respecting the tabs on adjacent division sheets to provide a single row of visible tabs along one end of each page group.

FRANK H. CRUMP.